United States Patent [19]
Chikuma et al.

[11] Patent Number: 5,278,930
[45] Date of Patent: Jan. 11, 1994

[54] FIBER TYPE WAVELENGTH CONVERTER

[75] Inventors: Kiyofumi Chikuma; Sota Okamoto, both of Tsurugashima, Japan

[73] Assignee: Pioneer Electronic Corporation, Tokyo, Japan

[21] Appl. No.: 928,512

[22] Filed: Aug. 11, 1992

Related U.S. Application Data

[63] Continuation-in-part of Ser. No. 844,119, Mar. 2, 1992.

[30] Foreign Application Priority Data

Aug. 14, 1991 [JP] Japan .................................. 3-204422
Aug. 7, 1992 [JP] Japan .................................. 4-211712

[51] Int. Cl.$^5$ .......................... G02B 6/16; G02F 1/37
[52] U.S. Cl. .................................. 385/122; 359/328; 359/332; 385/123
[58] Field of Search ............... 359/326, 327, 328, 329, 359/330, 331, 332; 385/122, 123

[56] References Cited

U.S. PATENT DOCUMENTS

| | | | |
|---|---|---|---|
| 4,962,993 | 10/1990 | Okamoto et al. | 385/122 |
| 5,022,738 | 6/1991 | Uenishi et al. | 385/122 |
| 5,112,122 | 5/1992 | Chikuma et al. | 359/332 |
| 5,119,384 | 6/1992 | Chikuma | 372/21 |
| 5,138,686 | 8/1992 | Chikuma et al. | 385/122 |

Primary Examiner—Frank Gonzalez
Attorney, Agent, or Firm—Perman & Green

[57] ABSTRACT

A fiber type optical wavelength converter has a core made of nonlinear optical crystal and a clad surrounding the core. The core and clad have an effective refractive index $N^\omega$ satisfying the following inequality

$$|(n_G{}^{2\omega})^2 - (N^\omega)^2| < 0.093(\lambda/a)^2$$

wherein $n_G{}^{2\omega}$ represents a refractive index of the core to the second harmonic wave corresponding to a dielectric tensor effectively utilized in the conversion, $\lambda$ represents a wavelength of the fundamental wave and a represents a radius of the core in the cross-section. The optical wavelength converter converts the fundamental wave $\lambda$ into the second harmonic wave $\lambda/2$ at a high efficiency.

5 Claims, 4 Drawing Sheets

Fig. 1

FUNDAMENTAL WAVE
3
10  20
SECOND HARMONICS

Fig. 2

$P^{2\omega}$ 3.8327
(1.22 $\pi$)

a·ka sin $\theta$

FIBER TYPE WAVELENGTH CONVERTER

CROSS REFERENCE TO RELATED APPLICATION

This application is a continuation in-part of copending U.S. patent application Ser. No. 844,119 filed Mar. 2, 1992 (still pending).

BACKGROUND OF THE INVENTION

1. Field of the Invention

The present invention relates to an optical wavelength converter, in particularly to a fiber type wavelength converter using Cerenkov radiation phase matching.

2. Description of the Related Art

Wavelength converters have been actively developed, which use nonlinear optical crystal to constitute an optical waveguide passage to guide an optical wave to a minute area, and effectively generate a second harmonic wave. These wavelength converters are generally classified into two types depending on the methods satisfying phase matching. The first type matches the phase velocity of a nonlinear polarization wave excited by an incident light of a fundamental wave with that of the second harmonic wave, and executes the phase matching between both the guide modes of the fundamental wave and of the second harmonic wave. The other type executes so-called Cerenkov radiation phase matching, i.e., the phase matching between the guide mode of the fundamental wave and the radiation mode of the second harmonic wave.

An optical wavelength converter is known, which is constituted in the shape of an optical fiber comprising a core made of nonlinear optical crystal and a clad surrounding the core. This optical wavelength converter employs the Cerenkov radiation phase matching. This optical wavelength converter is also known as an optical fiber type second harmonic wave generator (hereinafter referred to as "SHG").

Figure 1:
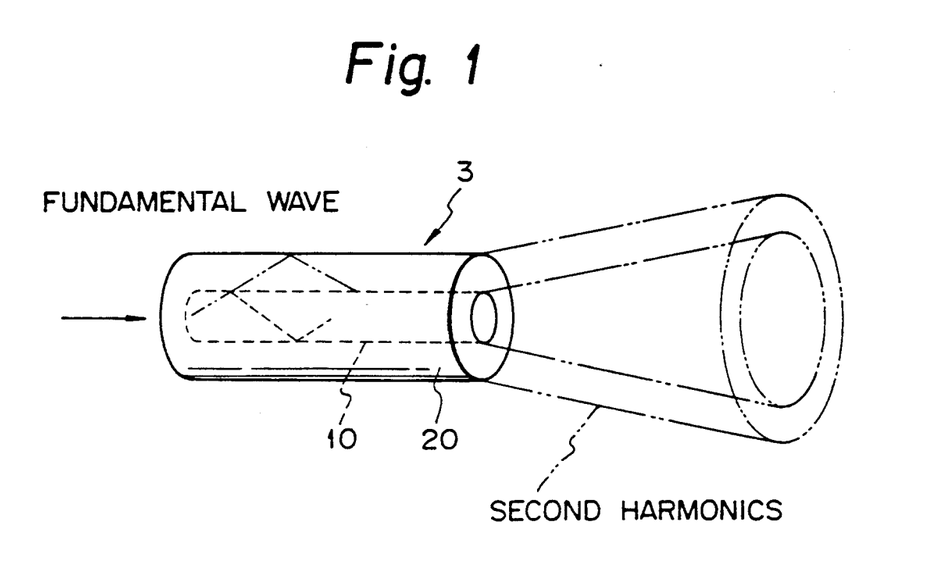
FIG. 1 is an enlarged perspective view of a fiber type optical wavelength converter.

FIG. 1 is a conceptual diagram of an SHG 3, which comprises a columnar core 10 and a cylindrical clad layer 20 concentrically surrounding the core 10. When the fundamental wave propagates through the core 10 from the left to the right in the diagram, a second harmonic wave is generated. In other words, the nonlinear polarization wave propagates at the same phase velocity and generates the second harmonic waves with a predetermined angle to the clad layer. The second harmonic waves are reflected within the inside surface of the clad layer 20 and propagate from the left to the right in the diagram. The phase matching between the guide mode of the fundamental wave and the radiation mode of the second harmonic wave is executed in the clad layer and the core.

The second harmonic wave and reflected wave at the boundary between the clad layer 20 are emitted from the end of the fiber in a corn shape as shown in FIG. 1. The equiphase wave surface of the wavefront of the thus emitted second harmonic wave is conical with the center axis of the fiber as its axis.

Figure 3:
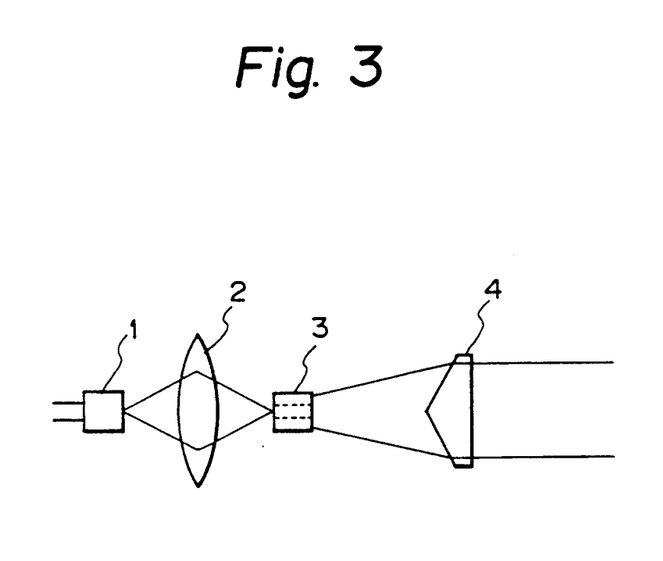
FIG. 3 is a schematic diagram of a short-wave light generator using an SHG.

According to the Cerenkov radiation system, it is possible to generate the second harmonic wave whose optical phase is almost automatically matched. The SHG is therefore applied to a short-wave light generator. As shown in FIG. 3, the short-wave light generator comprises a semiconductor laser 1, a coupling lens 2, an SHG 3 of which core is constituted by nonlinear optical crystal, and an axicon lens 4. The coupling lens 2 collects and guides the light emitted from the semiconductor laser 1 onto the end face of the SHG 3. The axicon lens 4, shapes the wavefront of the second harmonic wave, irradiated after conversion done by the optical wavelength converter, to form the second harmonic wave in the form of the parallel flux of light.

In this way, the short-wave light generator module is constituted by the above SHG. However, the optical nonlinear material of this type is not found yet which has an efficiently large nonlinear polarization constant. In addition, it is difficult to select a material of claddings having a suitable refractive index for the core surrounded by the clad. Consequently, the wavelength converting efficiency (the output power of an second harmonic wave to be emitted/the output power of the semiconductor laser, i.e. The output power of the second harmonic wave) is about 0.1% at maximum.

SUMMARY OF THE INVENTION

It is therefore an object of the present invention to provide a fiber type SHG which makes a sufficient use of the performance of a nonlinear optical material for the core and has a high converting efficiency.

To achieve this object, there is provided a fiber type optical wavelength converter comprising an optical fiber including a core made of a nonlinear optical crystal and a clad surrounding the core, in which a fundamental wave having a wavelength $\lambda$ entered and propagated in a direction of a center axis of the core is converted into a second harmonic wave having a half wavelength $\lambda/2$, wherein said core and said clad are made of a nonlinear optical material and an optical glass satisfying the following inequality respectively:

$$|(n_G^{2\omega})^2 - (N^\omega)^2| < 0.093(\lambda/a)^2 \tag{1}$$

where $n_G^{2\omega}$ represents a refractive index of said core to the second harmonic wave corresponding to a dielectric tensor effectively utilized in the conversion, $N^\omega$ represents an effective refractive index of the optical fiber, $\lambda$ represents a wavelength of the fundamental wave and a represents a radius of said core in the cross-section in such a manner that the core radius satisfies inequality 1, and wherein said effective refractive index of the fiber is the root of the following characteristic equation 4:

$$UJ_1(U)/J_0(U) = WK_1(W)/K_0(W) \tag{4}$$
$$U = k_0 a[(n_G^\omega)^2 - (N^\omega)^2]^{\frac{1}{2}}$$
$$W = k_0 a[(N^\omega)^2 - (n_S^\omega)^2]^{\frac{1}{2}}$$

where $J_1$ and $J_0$ denote the first and the zeroth Bessel functions of the first kind respectively;

$K_1$ and $K_0$ denote the first and the zeroth deformation Hankel functions respectively;

$n_G^\omega$ represents a refractive index of the core with respect to the fundamental wave;

$n_S^\omega$ represents a refractive index of the clad with respect to the fundamental wave; and $k_0$ denotes the propagation constant $2\pi/\lambda$ in vacuum.

Furthermore, the present invention provides a fiber type optical wavelength converter which suffices not only equation 1 but also the following equation 11

$$P^{2\omega} = 4\pi^2\omega^3\mu_0\epsilon_0^2 d^2 C^2 L G(2\beta) F(2\beta) \tag{11}$$

where
- $\omega$ denotes an angular frequency of the fundamental wave;
- $\mu_0$ denotes the permeability of vacuum;
- $\epsilon_0$ denotes a dielectric constant of vacuum;
- d denotes a constant of nonlinear polarization tensor effectively utilized in the wavelength conversion;
- C denotes a constant number based on the fundamental wave;
- $G(2\beta)$ denotes a factor influencing an interface reflection that the second harmonic wave reflects at the boundary between the core and clad due to a refractive index difference therebetween, which corresponds Fresnel coefficient of transmittance;
- $F(2\beta)$ denotes a factor influencing a so-call overlap integral between both distributions of a nonlinear polarization and an electric field;
- $\beta$ denotes a propagation constant of the fundamental wave propagating the fiber; and
- L denotes a length of the core crystal, wherein said constant number based on the fundamental wave C is approximated by the following formula 3:

$$C \approx \frac{2(\mu_0/\epsilon_0)^{\frac{1}{2}} W^2 P^\omega}{\pi a^2 N^\omega (U^2 + W^2)} \quad (3)$$

where
- a denotes a core radius;
- $N^\omega$ denotes an effective refractive index in $LP_{01}$ mode for propagating the fundamental wave with the propagation constant $\beta$ in the fiber; and
- $P^\omega$ denotes a power of the fundamental wave, and wherein said $\lambda$ is a selected wavelength of the fundamental wave corresponding a value of said factor $G(2\beta)$ within the full width at half maximum, preferably an adjacent value of one peak of a curve of said factor $G(2\beta)$ including a plurality of peaks.

According to the selection of core materials, the wavelength of the fundamental wave, the radius of the core and clad materials satisfying the above inequality 1, the fiber type optical wavelength converter easily converts the fundamental wave into the second harmonic wave of half wavelength at a high efficiency.

DETAILED DESCRIPTION OF A PREFERRED EMBODIMENT

An preferred embodiment of the present invention will be described below referring to the accompanying drawings.

The structure of an SHG according to the present invention is approximately the same as the one illustrated in FIG. 1. The SHG is an optical fiber comprising the columnar core made of nonlinear optical crystal, and a cylindrical clad layer made of optical glass enclosing the core concentrically. The SHG has a characteristic that the optical fiber has an effective refractive index $N^\omega$ satisfying the following inequality $$|(n_G{}^{2\omega})^2 - (N^\omega)^2| < 0.093(\lambda/a)^2 \quad (1)$$

wherein $n_G{}^{2\omega}$ represents a refractive index of the core to the second harmonic wave corresponding to an SHG tensor effectively utilized in the conversion, $\lambda$ represents a wavelength of the fundamental wave and a represents a radius of the core in the cross-section. The effective refractive index $N^\omega$ is determined by both indexes of the core and clad and the core radius as described hereinafter. The SHG tensor is a tensor quantity of a second nonlinear optical constant $d_{ijk}$ expressed as a three degree determinant, for example, a $3 \times 6$ determinant $d_{il}$:

$$\begin{bmatrix} d_{11} & d_{12} & d_{13} & d_{14} & d_{15} & d_{16} \\ d_{21} & d_{22} & d_{23} & d_{24} & d_{25} & d_{26} \\ d_{31} & d_{32} & d_{33} & d_{34} & d_{35} & d_{36} \end{bmatrix}$$

By using this determinant dil, the relationship between a nonlinear polarization in the core $P^{NL}$ and an electric field $E^\omega$ of the fundamental wave can be expressed as follows:

$$\begin{bmatrix} P_x^{NL} \\ P_y^{NL} \\ P_z^{NL} \end{bmatrix} = \epsilon_0 \begin{bmatrix} d_{11} & d_{12} & d_{13} & d_{14} & d_{15} & d_{16} \\ d_{21} & d_{22} & d_{23} & d_{24} & d_{25} & d_{26} \\ d_{31} & d_{32} & d_{33} & d_{34} & d_{35} & d_{36} \end{bmatrix} \begin{bmatrix} (E_x^\omega)^2 \\ (E_y^\omega)^2 \\ (E_z^\omega)^2 \\ 2E_y^\omega E_z^\omega \\ 2E_z^\omega E_x^\omega \\ 2E_x^\omega E_y^\omega \end{bmatrix}$$

wherein $\epsilon_0$ denotes a dielectric constant of vacuum. Therefore, both the polarization state of the fundamental wave and the orientation of the core crystal determine both the tensor components in the SHG tensor to be utilized and the polarization state of the second harmonic wave generated by the fiber type wavelength converter. Thus, $n_G{}^{2\omega}$ represents a refractive index of the core with respect to the second harmonic wave in such a polarization state.

Inventors have analyzed an electromagnetic field in the SHG while considering the presence of the boundary between the clad and the core with the clad diameter set finite as per the actual SHG. From the analysis, Inventors have found that both the outputs of the SHGs are substantially equal to each other, one of the SHG having such a fiber radius and a core crystal length (SHG length) as the second harmonic wave generated once by the core no longer comes back to the core, namely, as it is fully reflected at most once by the boundary between the clad layer and air, and the other having an infinite fiber radius and an endless SHG length. In other words, Inventors found out that the output power of the SHG can be approximated by using the SHG length that the second harmonic wave is fully reflected only once by the boundary between the clad and air without repeating.

Therefore, the output power of the second harmonic wave generated by the SHG comprising a core and an infinite clad layer was analyzed by the following process.

Fundamental Wave in LP$_{01}$ Mode

Given that a fundamental wave with the propagation constant $\beta$ in LP$_{01}$ mode is propagated in an SHG, a nonlinear polarization P$^{NL}$ to be excited is defined by the following equation 2:

$$P^{NL} = \epsilon_0 d C J_0^2(Ur) \exp(-i2\beta z) \tag{2}$$

where

- Z denotes a waveguide direction of the SHG;
- $\epsilon_0$ denotes the dielectric constant of vacuum;
- d denotes a constant of nonlinear polarization tensor effectively utilized in the wavelength conversion; and
- C denotes a constant number based on the fundamental wave.

By using the guided power of the fundamental wave, the constant number based on the fundamental wave C is approximated by the following formula 3:

$$C \approx \frac{2(\mu_0/\epsilon_0)^{\frac{1}{2}} W^2 P^\omega}{\pi a^2 N^\omega (U^2 + W^2)} \tag{3}$$

$$U = a(\omega^2 \mu_0 \epsilon_g^\omega - \beta^2)^{\frac{1}{2}}$$
$$W = a(\beta^2 - \omega^2 \mu_0 \epsilon_S^\omega)^{\frac{1}{2}}$$

where

- $\omega$ denotes an angular frequency of the fundamental wave;
- a denotes a core radius of the SHG;
- $N^\omega$ denotes an effective refractive index in LP$_{01}$ mode for propagating the fundamental wave with the propagation constant $\beta$ in the fiber of the SHG;
- $\mu_0$ denotes the permeability of vacuum;
- $\epsilon_g^\omega$ denotes a dielectric constant of the core with respect to the fundamental wave; and
- $\epsilon_S^\omega$ denotes a dielectric constant of the clad with respect to the fundamental wave.

The effective refractive index of the SHG fiber comprising the core and clad layer $N^\omega$ is the root of the following characteristic equation 4:

$$UJ_1(U)/J_0(U) = WK_1(W)/K_0(W) \tag{4}$$
$$U = k_0 a[(n_G^\omega)^2 - (N^\omega)^2]^{\frac{1}{2}} = a(\omega^2\mu_0\epsilon_g^\omega - \beta^2)^{\frac{1}{2}}$$
$$W = k_0 a[(N^\omega)^2 - (n_S^\omega)^2]^{\frac{1}{2}} = a(\beta^2 - \omega^2\mu_0\epsilon_S^\omega)^{\frac{1}{2}}$$

where

- J$_1$ and J$_0$ denote the first and the zeroth Bessel functions of the first kind respectively;
- K$_1$ and K$_0$ denote the first and the zeroth deformation Hankel functions respectively;
- $n_G^\omega$ represents a refractive index of the core with respect to the fundamental wave;
- $n_S^\omega$ represents a refractive index of the clad with respect to the fundamental wave; and
- k$_0$ denotes the propagation constant $2\pi/\lambda$ in vacuum.

(Electric field of the second harmonic wave)

By using Green's function G$^D$(r,r') in consideration of the boundaries, an electric field of an second harmonic wave E$^{2\omega}$(r) of the core is expressed as follows:

$$E^{2\omega}(r) = i2\omega^2\mu_0\epsilon_0 dC \int_{-\infty}^{\infty} \int_0^a G^D(r,r') J_0(Ur')^2 r' dr' \times \tag{5}$$
$$\frac{\sin[(2\beta - \kappa)L/2]}{(2\beta - \kappa)} \exp(-i\kappa z) d\kappa$$

where L denotes a length of the core crystal. Using the Green's function G(r,r') over the whole space and an arbitrary function A($\kappa$), G$^D$(r,r') will be given as follows:

$$G^D(r,r') = G(r,r') + A(\kappa) J_0(r\zeta) J_0(r'\zeta) \tag{6}$$

G(r,r') will be expressed as follows:

$$G(r,r') = \begin{cases} H_0^{(1)}(r\zeta) J_0(r'\zeta) & (r > r') \\ H_0^{(1)}(r'\zeta) J_0(r\zeta) & (r < r') \end{cases} \tag{7}$$

where H$_0^\omega$ and J$_0$ are the zeroth Hankel function of the first kind and the zeroth Bessel function respectively, and $\zeta^2 = 4\omega^2\mu_0\epsilon_g^\omega - \kappa^2$.

The Power of the Second Harmonic Wave

The power of the second harmonic wave p$^{2\omega}$ is obtained by the following equation 8:

$$p^{2\omega} = 8\pi\omega^3\mu_0\epsilon_0^2 d^2 C^2 \int_{-\infty}^{\infty} G(\kappa) F(\kappa) \frac{\sin^2[(2\beta - \kappa)L/2]}{(2\beta - \kappa)^2} d\kappa. \tag{8}$$

where

G(2$\beta$) denotes a factor influencing an interface reflection that the second harmonic wave reflects at the boundary between the core and clad due to a refractive index difference therebetween, which corresponds Fresnel coefficient of transmittance; and F(2$\beta$) denotes a factor influencing a so-call overlap integral between both distributions of a nonlinear polarization and an electric field.

The factor G(2$\beta$) can be defined with the boundary conditions. The factors G(2$\beta$) and F(2$\beta$) are expressed by the following equations 9 and 10:

$$F(\kappa) = \left| \int_0^a J_0(r\zeta) J_0(Ur)^2 r dr \right|^2 \tag{9}$$

$$G(\kappa) = \text{Real}\left\{ -i \frac{\eta N_0(a\gamma) H_1^{(1)}(a\eta) - \zeta N_1(a\gamma) H_0^{(1)}(a\eta)}{J_0(a\gamma) H_1^{(1)}(a\eta) - \eta J_1(a\gamma) H_0^{(1)}(a\eta)} \right\} \tag{10}$$

$$\gamma = (4\omega^2\mu_0\epsilon_G^{2\omega} - \kappa^2)^{\frac{1}{2}}$$
$$\eta = (4\omega^2\mu_0\epsilon_S^{2\omega} - \kappa^2)^{\frac{1}{2}}$$

where

- $\epsilon_G^{2\omega}$ denotes a dielectric constant of the core with respect to the second harmonic wave;
- $\epsilon_S^{2\omega}$ denotes a dielectric constant of the clad with respect to tho second harmonic wave;
- N$_0$ and N$_1$ denote the zeroth and the first Neumann functions respectively;

$J_1$ and $J_0$ denote the first and the zeroth Bessel functions of the first kind respectively; and $H_1$ and $H_0$ denote the first and the zeroth deformation Hankel functions respectively.

Since the term $\sin^2[(2\beta-\kappa)L/2]/(2\beta-\kappa)^2$ in equation 8 is approximated with Dirac delta function $\pi L\delta(2\beta-\kappa)/2$, the output power of the second harmonic wave $P^{2\omega}$ is obtained as the following equation (11).

$$P^{2\omega} = 4\pi^2\omega^3\mu_0\epsilon_0^2 d^2 C^2 LG(2\beta)F(2\beta) \quad (11)$$

As seen from this equation 11, the output power of the second harmonic wave $P^{2\omega}$ is influenced by these factors $G(2\beta)$ and $F(2\beta)$.

The power of the second harmonic wave depending on $F(2\beta)$

Since the power of the second harmonic wave is greatly influenced by the factor $F(2\beta)$ in equation 11, a value of $F(2\beta)$ should be considered in order to obtain conditions for a high conversion efficiency. Namely, it is understood that the power of the second harmonic wave increases as the value of the following integral so-called called overlap integral is greater.

$$F(2\beta) = \left| \int_0^a J_0(r\zeta)J_0(Ur)^2 r\,dr \right|^2 \quad (12)$$

Since the term $J_0(Ur)^2$ in the overlap integral indicates a function that an electric field of the fundamental wave waveguided is distributed in the core, it hardly changes with respect to r. Therefore, given that $J_0(Ur)^2 = 1$, then the overlap integral is calculated as follows:

$$F(2\beta) = (a^4/4)[2J_1(a\gamma)/(a\gamma)]^2 \quad (13)$$

The formation of this integral value with respect to $a\gamma$ indicates a pattern similar to a diffraction image generated from a circular aperture irradiated by light having the maximum fringe at $\gamma = 1$. This integral value has a first lobe with the maximum area within $a\gamma < 3.833$ which is grater than that of the other lobe areas. $\gamma^2$ is expressed by $$\gamma^2 = (4\pi/\lambda)^2[(n_G^{2\omega})^2 - (N^\omega)^2] \quad (13a).$$

In other words, by considering an angle of Cerenkov radiation direction, the power of the second harmonic wave $P^{2\omega}$ will be expressed by the following approximation equation 14:

$$P^{2\omega} \propto \left| \int_0^a J_0(r\zeta)J_0(Ur)^2 r\,dr \right|^2 \approx \frac{a^4}{4}\left[\frac{2J_1(ak_G\sin\theta)}{ak_G\sin\theta}\right]^2 \quad (14)$$

where $\theta$ represents an angle of Cerenkov radiation, $k_G$ represents a normalization frequency expressed by the following equation:

$$k_G = 4\pi n_G^{2\omega}/\lambda, \quad (15)$$

Figure 2:
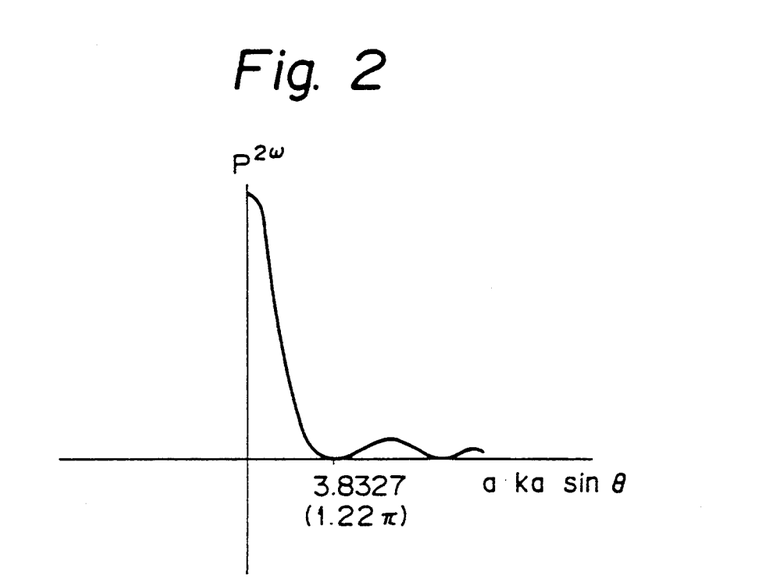
FIG. 2 is a graph showing a power property curve in the fiber type optical wavelength converter according to the present invention.

$n_G^{2\omega}$ represents a refractive index of the core to the second harmonic wave and $\lambda$ represents a wavelength of fundamental wave. On the basis of the above approximation equation 14, the power of the second harmonic wave $P^{2\omega}$ will be expressed by such a graph as shown in FIG. 2. It will be understood that the second harmonic wave radiates from the SHG as a diffraction light components in the Cerenkov radiation direction within the diffraction light having the amplitude distribution $J_0(Ur)^2$. The power distribution of the second harmonic wave appears as the Airy pattern. In other words, equation 14 implies that the wavelength converter irradiates only light diffracted in the direction of the Cerenkov radiation angle out of all diffraction light generated from a circular aperture irradiated by light having the amplitude distribution $J_0(Ur)^2$. Therefore, it is necessary that the Cerenkov radiation angle exist in the main lobe of the diffracted image to obtain a high conversion efficiency.

As apparent from FIG. 2, the main or most power intensity $P^{2\omega}$ is obtained within from the peak to the first trough (from 0 to 3.8327 on the $ak_G\sin\theta$ axis) in the property curve of the power of the second harmonic wave. Therefore the angle of Cerenkov radiation $\theta$ in the range satisfying the following inequality $$\sin\theta < 3.8327/ak_G \quad (16)$$

preferably suffices a requirement to obtain the main power of the second harmonic wave. The effective refractive index $N^\omega$ in the core extending direction is expressed by the following equation $$N^\omega = n_G^{2\omega}\cos\theta \quad (17)$$

Using the equations 13a and 17, the relationship between the refractive indexes, the wavelength of the fundamental wave and the core radius is expressed by the following inequality $$(n_G^{2\omega})^2 - (N^\omega)^2 < 0.093(\lambda/a)^2 \quad (18)$$

Since effective refractive index in the waveguide mode to the fundamental wave is therefore defined by the refractive indexes of the clad optical glass and the core material to the fundamental wave as shown in equation 4, the second harmonic wave is easily generated at a high efficiency by selecting the core materials, the wavelength of the fundamental wave, the core radius and the clad materials so as to satisfy the above inequality (1).

The Power of the Second Harmonic Wave Depending on $G(2\beta)$

Furthermore, the factor $G(2\beta)$ should be considered in order to obtain other conditions for a higher conversion efficiency. For this, it is preferable that the SHG suffices not only the requirement of equation 1 but also that of factor $G(2\beta)$ which should be increased. The factor $G(2\beta)$ comprises a function including the $\gamma$ and $\delta$, which complicatedly changes in accordance with both the refractive indexes of the core with respect to the second harmonic wave $n_G^{2\omega}$ and that of the clad with respect to the second harmonic wave $n_S^{2\omega}$ as parameters for designing of the wavelength converter. Therefore, the change of the factor $G(2\beta)$ have been investigated by changing $n_G^{2\omega}$ and $n_S^{2\omega}$. The tendency of $G(2\beta)$ is calculated through the following equations 19 and 20.

$$\zeta^2|_{K=2\beta} = (2k)^2((n_G^{2\omega})^2 - (N^\omega)^2) \quad (19)$$

$$\eta^2|_{K=2\beta} = (2k)^2((n_S^{2\omega})^2 - (N^\omega)^2) \quad (20)$$

Figure 4:
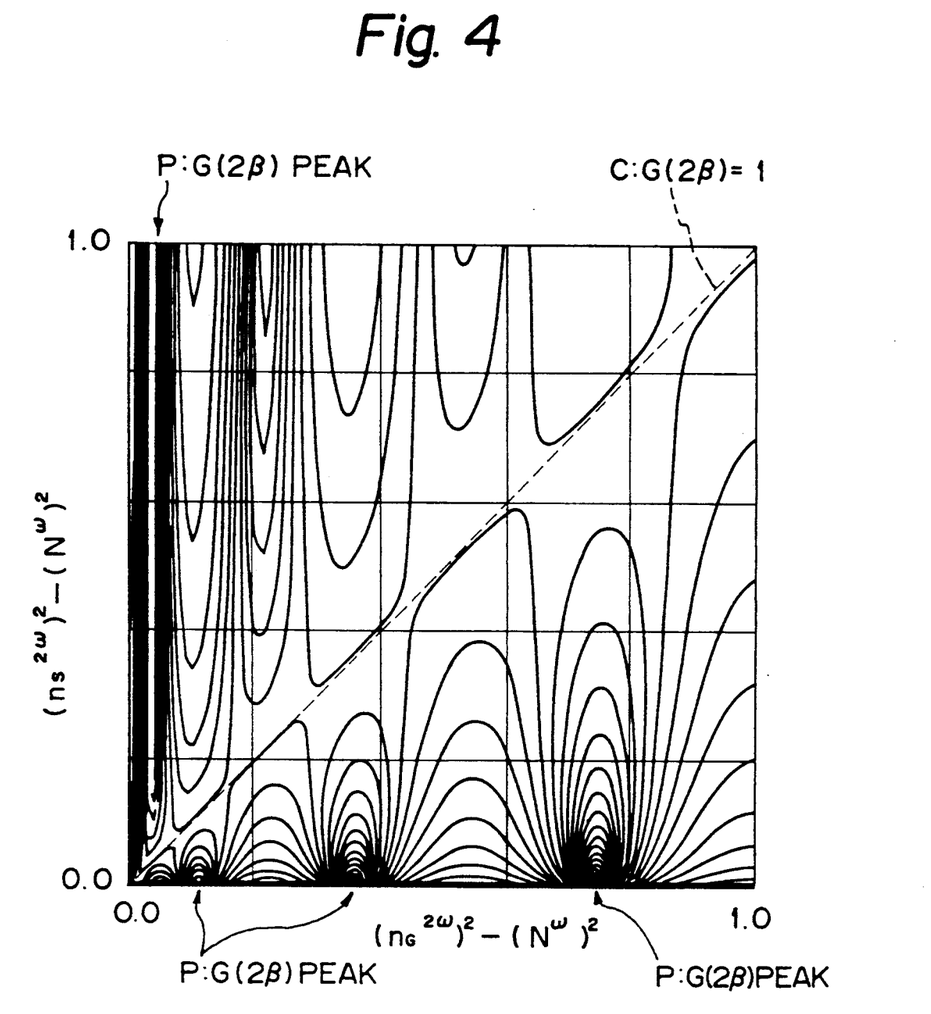
FIG. 4 is a graph showing the $G(2\beta)$ property curve depending on the wavelength of the fundamental wave in an SHG.

FIG. 4 shows a graph of an isarithm or contour map prepared on the basis of these equations in which the abscissa indicates an increase ratio of the refractive index of the core with respect to the second harmonic wave from the effective refractive index of the optical fiber $(n_G^{2\omega})^2 - (N^\omega)^2$, and the ordinate indicates an increase ratio of the refractive index of the clad with respect to the second harmonic wave from the effective refractive index of the optical fiber $(n_S^{2\omega})^2 - (N^\omega)^2$, the carves being plotted along the equivalent values $G(2\beta)$ in the plane containing two coordinate axes. The direction indicating the high value $G(2\beta)$ corresponds the vertical direction to such a plane. It is analyzed that, when the refractive indexes of the core and clad with respect to the second harmonic wave are equal to each other, $G(2\beta) = 1$ is obtained as shown by the dots line C of FIG. 4. Particularly, it will be understood that an envelope of the curves of $G(2\beta)$ in a vertical plane has a plurality of peaks of the maximum each marked by P in several places along the abscissa and that such peaks follows to ridges extending parallel to the ordinate, the vertical plane being parallel to the abscissa and vertical to the ordinate of the isarithm map showing the equivalent values of the factor $G(2\beta)$. Namely, the $G(2\beta)$ values at the peaks and ridges are greater than those at other places. The $G(2\beta)$ value is sufficient within a full width at half maximum of the envelope cut out in the vertical plane so that a high conversion efficiency is obtained in the SHG. The generation of these peaks should be used for the designing of an SHG with a high conversion efficiency. Thus the SHG with a high conversion efficiency is obtained by selecting a wavelength of the fundamental wave corresponding a value of the factor $G(2\beta)$ within the full width at half maximum, preferably an adjacent value of one peak of a curve of the factor $G(2\beta)$ including a plurality of peaks.

Figure 5:
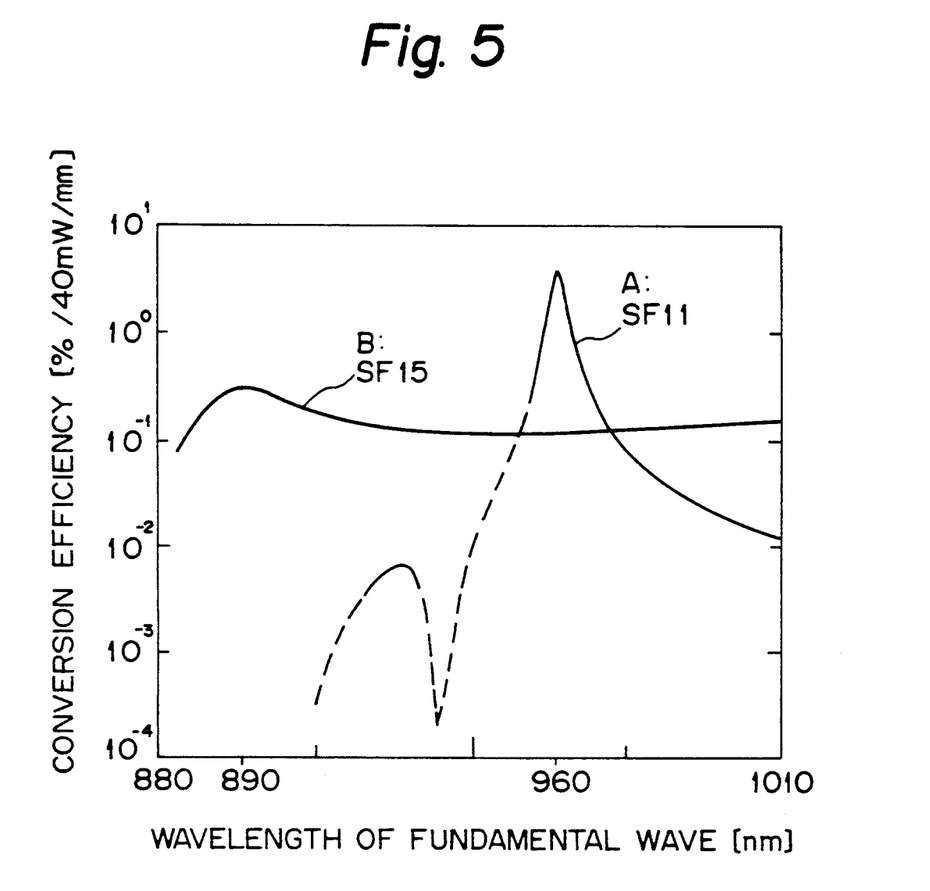
FIG. 5 is a graph showing the conversion efficiency with respect to the wavelength of the fundamental wave.

FIG. 5 shows a property of the conversion efficiency depending on the wavelength of the fundamental wave, in which the curve A shows a property of the SHG comprising the core made of DMNP and the clad made of SF11 glass, and the curve B shows a property of the SHG comprising the core made of DMNP and the clad made of SF15 glass. As seen from the graphs, the conversion efficiencies of the SHG surge and increase in accordance with the peaks. In these cases, the wavelength converting efficiency (the power of an second harmonic wave/the power of the second harmonic wave) are obtained through equation 11 with parameter $\lambda$ under conditions of the power of the fundamental wave 40 mW and the SHG length 1 mm.

As shown in FIG. 5 (curve A), the high conversion efficiency is obtained when SF11 glass is selected for the clad material and 960 nm is selected for the wavelength of the fundamental wave. When this selection of SF11 glass for the clad and of 960 nm for the fundamental wave, such a wavelength corresponds to one of peaks in the carve of $G(2\beta)$ as shown in FIG. 4. When SF15 glass is selected for the clad and 890 nm is selected for the fundamental wave as shown with curve B of FIG. 5, such a wavelength corresponds to one of peaks in the carve of $G(2\beta)$ as shown in FIG. 4.

In this way, by scanning the wavelengths of the fundamental waves and selecting a pertinent one from the clad materials, the high conversion efficiency can be found out for the SHG, although the diffractive index changes due to the diffractive index dispersion of the wavelength of the fundamental wave entering the fiber comprising the core and clad.

Accordingly, it is preferable to satisfy the above equation 1 by the selected combination of a core radius, a glass material for the clad and a nonlinear optical material for the core and, at the same time, to select parameters, i.e., a clad glass and a wavelength of the fundamental wave for generating the peaks of the carve of $G(2\beta)$ for designing of an SHG with a high conversion efficiency.

What is claimed is:

1. A fiber type optical wavelength converter comprising an optical fiber including a core made of a nonlinear optical crystal and a clad surrounding the core, in which a fundamental wave having a wavelength $\lambda$ can enter and propagate in a direction of a center axis of the core and be converted into a second harmonic wave having a half wavelength $\lambda/2$, wherein said core and said clad are made of a nonlinear optical material and an optical glass satisfying the following inequality respectively:

$$|(n_G^{2\omega})^2 - (N^\omega)^2| < 0.093(\lambda/a)^2 \quad (1)$$

where $n_G^{2\omega}$ represents a refractive index of said core to the second harmonic wave corresponding to a dielectric tensor, $N^\omega$ represents an effective refractive index of the optical fiber, $\lambda$ represents a wavelength of the fundamental wave and a represents a radius of said core in the cross-section in such a manner that the core radius satisfies inequality 1.

2. A fiber type optical wavelength converter according to claim 1, wherein said effective refractive index of the fiber is the root of the following characteristic equation 4:

$$UJ_1(U)/J_0(U) = WK_1(W)/K_0(W) \quad (4)$$
$$U = k_0 a[(n_G^\omega)^2 - (N^\omega)^2]^{\frac{1}{2}}$$
$$W = k_0 a[(N^\omega)^2 - (n_S^\omega)^2]^{\frac{1}{2}}$$

where $J_1$ and $J_0$ denote the first and the zeroth Bessel functions of the first kind respectively;

$K_1$ and $K_0$ denote the first and the zeroth modified Hankel functions respectively;

$n_G^\omega$ represents a refractive index of the core with respect to the fundamental wave;

$n_S^\omega$ represents a refractive index of the clad with respect to the fundamental wave; and $k_0$ denotes the propagation constant $2n/\lambda$ in vacuum.

3. A fiber type optical wavelength converter according to claim 2, wherein said $\lambda$ is a selected wavelength of the fundamental wave corresponding to a value of a factor $G(2\beta)$ within the full width at half maximum, preferably an adjacent value of one peak of a curve of said factor $G(2\beta)$ including a plurality of peaks and belonging to the following equation 11

$$P^{2\omega} = 4\pi^2\omega^3\mu_0\epsilon_0^2 d^2 C^2 L G(2\beta) F(2\mu) \quad (11)$$

where $\omega$ denotes an angular frequency of the fundamental wave;

$\mu_0$ denotes the permeability of vacuum;

$\epsilon_0$ denotes a dielectric constant of vacuum;

d denotes a constant of nonlinear polarization tensor effectively utilized in the wavelength conversion; and C denotes a constant number based on the fundamental wave;

G(2β) denotes a factor influencing an interface reflection that the second harmonic wave reflects at the boundary between the core and clad due to a refractive index difference therebetween which corresponds Fresnel coefficient of transmittance;

F(2β) denotes a factor influencing a so-call overlap integral between both distributions of a nonlinear polarization and an electric field;

β denotes a propagation constant of the fundamental wave propagating in the fiber;

L denotes a length of the core crystal; and $P^{2\omega}$ denotes the output power of the second harmonic wave.

4. A fiber type optical wavelength converter according to claim 3, wherein said constant number based on the fundamental wave C is approximated by the following formula 3:

$$C \simeq \frac{2(\mu_0/\epsilon_0)^{\frac{1}{2}} W^2 P^\omega}{\pi a^2 N^\omega (U^2 + W^2)} \qquad (3)$$

where
- a denotes a core radius;
- $N^\omega$ denotes an effective refractive index in $LP_{01}$ mode for propagating the fundamental wave with the propagation constant β in the fiber;
- $P^\omega$ denotes a power of the fundamental wave.

5. A fiber type optical wavelength converter according to claim 1, wherein the angle of Cerenkov radiation θ is in the range satisfying the following inequality $$\sin\theta < 3.8327/ak_G \qquad (16)$$

where $k_G$ represents a normalization frequency expressed by the following equation:

$$k_G = 4\pi n_G^{2\omega}/\lambda \qquad (15).$$

* * * * *